July 20, 1954  J. F. JOY  2,684,235
KERF CUTTER AND DISLODGING MECHANISM
FOR MINING AND LOADING APPARATUS
Filed Feb. 28, 1950  7 Sheets-Sheet 1

INVENTOR:
Joseph F. Joy
BY Charles F. Osgood,
ATTORNEY

July 20, 1954
J. F. JOY
2,684,235
KERF CUTTER AND DISLODGING MECHANISM
FOR MINING AND LOADING APPARATUS
Filed Feb. 28, 1950
7 Sheets-Sheet 2

INVENTOR:
Joseph F. Joy
BY
Charles F Osgood,
ATTORNEY

July 20, 1954  J. F. JOY  2,684,235
KERF CUTTER AND DISLODGING MECHANISM
FOR MINING AND LOADING APPARATUS
Filed Feb. 28, 1950  7 Sheets-Sheet 5

INVENTOR:
Joseph F. Joy
By Charles F. Osgood,
ATTORNEY

July 20, 1954

J. F. JOY

2,684,235

KERF CUTTER AND DISLODGING MECHANISM
FOR MINING AND LOADING APPARATUS

Filed Feb. 28, 1950

INVENTOR:
Joseph F. Joy
By Charles F. Osgood,
ATTORNEY

July 20, 1954  J. F. JOY  2,684,235
KERF CUTTER AND DISLODGING MECHANISM
FOR MINING AND LOADING APPARATUS
Filed Feb. 28, 1950  7 Sheets-Sheet 7

INVENTOR:
Joseph F. Joy
By Charles F. Osgood,
ATTORNEY

Patented July 20, 1954

2,684,235

UNITED STATES PATENT OFFICE 2,684,235

KERF CUTTER AND DISLODGING MECHANISM FOR MINING AND LOADING APPARATUS

Joseph F. Joy, Pittsburgh, Pa., assignor to Joy Manufacturing Company, Pittsburgh, Pa., a corporation of Pennsylvania Application February 28, 1950, Serial No. 146,884

13 Claims. (Cl. 262—9)

This invention relates to mining apparatus and more particularly to mining and loading apparatus for cutting the coal or like mineral of a solid coal seam or mine vein, for dislodging the mineral as cutting progresses and for loading the dislodged mineral.

In my Patent No. 2,261,160, dated November 4, 1941, there is disclosed a mining and loading apparatus embodying two cooperating sets or gangs of cutting and dislodging bars mounted to swing horizontally about parallel upright axes for cutting and dislodging the coal of a solid coal seam, and embodying conveying means for loading the dislodged coal. In my Patent No. 2,261,162, dated November 4, 1941, there is shown a mining and loading apparatus having superimposed cutter bars for cutting parallel horizontal kerfs in a solid coal seam and having the top cutter mounted for tilting movement in a vertical plane to apply a downward prying or lever action to the projection or core of coal formed between the superimposed kerfs cut by the cutter bars to effect dislodgement of the projection of coal, and having an associated conveying mechanism for loading the dislodged coal. In both of the patents referred to the apparatus is mounted on a skid base and embodies jack devices whereby the apparatus may be "walked" over the mine floor. The present invention contemplates improvements over such previous mining and loading apparatus in that improved kerf cutting means is provided for cutting out a projection or core of coal from a solid coal seam and improved breaker mechanism is associated with the kerf cutting means for dislodging the projection or core of coal as cutting progresses, and having improved conveying means embodied therein for loading the dislodged coal.

An object of the present invention is to provide an improved mining apparatus for dislodging the coal or like mineral from a solid coal seam or mine vein. Another object is to provide improved kerf cutting means for cutting out a projection or core of coal or like mineral from a solid coal seam or mine vein and having associated therewith improved breaker mechanism for dislodging fragments of the core as cutting progresses. Another object is to provide an improved apparatus for cutting, dislodging and loading coal or similar mineral in an underground mine. A further object is to provide an improved breaker or dislodging mechanism adapted for association with the kerf cutter of a mining apparatus. A still further object is to provide an improved mechanical breaker device mounted on a cutter bar within the orbit of the cutter chain and having improved power operated actuating means therefor. Yet another object is to provide an improved mining apparatus having novel features of construction and novel arrangements and combinations of parts. These and other objects and advantages of the invention will, however, hereinafter more fully appear.

In the accompanying drawings there is shown for purposes of illustration one form which the invention may assume in practice.

In these drawings:

Figs. 1 and 1a, taken together, constitute a plan view of a mining and loading apparatus constructed in accordance with a preferred illustrative embodiment of the invention.

Figs. 2 and 2a, taken together, constitute a side elevational view of the mining and loading apparatus shown in Figs. 1 and 1a.

In this illustrative embodiment of the invention, as shown in the drawings, the mining and loading apparatus constitutes an improvement over those disclosed in my patents above referred to in that improved kerf cutting means generally designated 1 is provided having improved dislodging mechanism generally designated 2 associated therewith. The kerf cutting means embodies two sets or gangs of superimposed kerf cutters each including a bottom kerf cutter 3 and a top kerf cutter 4, the latter having the dislodging mechanisms associated therewith, and each top cutter is mounted by an improved adjustable supporting structure 5 on a sliding frame structure 6 which also carries conveying means generally designated 7 for receiving the dislodged coal and for conveying the dislodged coal rearwardly of the apparatus to a suitable point of delivery.

Now referring to the detail structure of the mining and loading apparatus and particularly to the sliding frame structure 6, it will be noted that slidable over the floor of the mine is a bottom skid or skid base 8 having suitable longitudinal guideways along which a main frame 9 of the apparatus is guided for sliding movement longitudinally relative to the bottom skid. Connected between the sliding frame 9 and the bottom skid are parallel longtiudinally extending hydraulic feeding and retracting jacks 10 which are fully disclosed in my Patent No. 2,261,160 mentioned above. Carried by the central forward portion of the sliding frame 9 is a centrally located, vertical hydraulic floor engaging jack 11 for removing a portion of the weight of the apparatus from the bottom skid during certain of the "walking" operations, and carried at the opposite sides of the rear end of the sliding frame are vertical hydraulic floor engaging jacks 12, 12 adapted to elevate the rear portion of the frame during the "walking" operation. When the floor engaging jacks 11 and 12 are elevated out of engagement with the floor fluid under pressure may be supplied to the jacks 10 to feed the frame longitudinally along its guideways relative to the bottom skid, and when fluid under pressure is supplied to the floor engaging jacks 11 and 12 the frame may be elevated with respect to the mine floor to remove the weight of the apparatus from the bottom skid, and then again upon operation of the hydraulic jacks 10 the bottom skid may be shifted along the guideways relative to the frame 9. Thereafter the fluid may be vented from the floor engaging jacks 11 and 12 to again bring the bottom skid onto the mine floor and fluid then may again be supplied to the hydraulic jacks 10 again to feed the frame 9 forwardly relative to the skid. These feeding, elevating, and lowering operations are repeated in such manner as to effect "walking" of the apparatus over the mine floor in the manner fully disclosed in my above mentioned Patent No. 2,261,160. Since this bottom skid and jack structure does not per se enter into the present invention further disclosure thereof herein is unnecessary, other than as described later on in connection with the diagram of Fig. 9.

Figure 5:
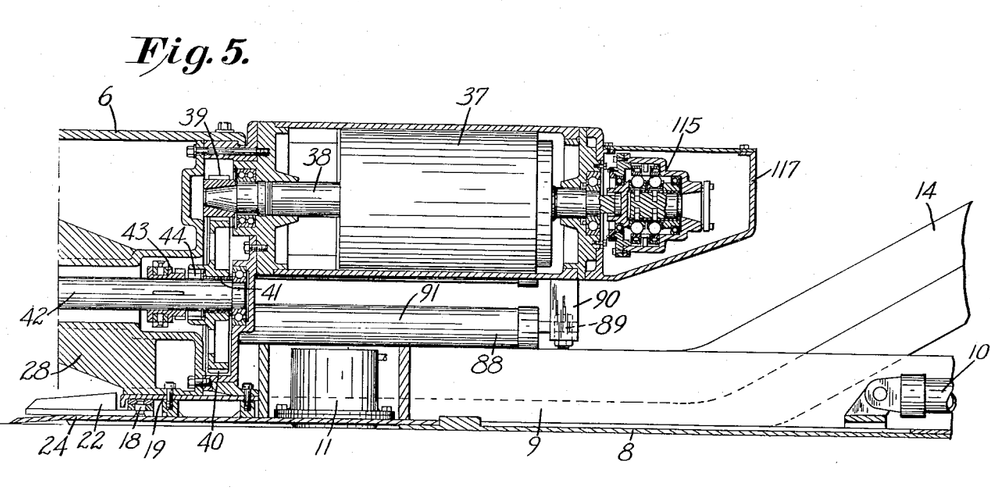
Fig. 5 is an enlarged longitudinal vertical sectional view taken substantially on line 5—5 of Fig. 1.

The conveying means 7 may be generally similar to the disclosed in my Patent No. 2,261,162, and includes a conveyor frame 13 mounted at the sides of the lower portion of the sliding frame structure 6 and having upwardly and rearwardly inclined side frame portions 14 and an elevated horizontal rear frame portion 15. This rearward conveyor frame portion is mounted on a rear frame structure 16 carried at the rear end of the sliding frame structure 6. An endless flight conveyor 17 has an endless conveyor chain 18 guided for circulation in suitable guideways 19 on the conveyor frame and is driven through a chain and sprocket connection 20 (see Fig. 1a) from a motor 21 carried by the rear frame structure 16. Projecting laterally from the conveyor chain 18 are flights 22 which are adapted to move over bottom plates 23 which extend along the sides of the sliding frame 9 at the bottoms of the frame portions 14 and 15, and these flights as they move transversely across the front end of the frame move along a bottom plate 24 which lies close to the mine floor, as shown in Fig. 5, in a position to receive dislodged coal from the mine floor and for conveying the dislodged coal rearwardly along the portions 14 and 15 of the conveyor frame at one side of the sliding frame 9 to discharge in an elevated position at a suitable point of delivery at the rear end of the apparatus. Also, driven by the motor 21 and mounted on the rear frame structure 16 is a cable winding drum 25 on which a feed cable 26 is wound, whereby the apparatus may be rapidly moved bodily over the mine floor in a manner also disclosed in my Patent No. 2,261,160.

Now referring to the kerf cutting means 1 it will be noted that the sets or gangs of kerf cutters are mounted on a forward upstanding portion 28 of the sliding frame 9 to swing horizontally toward and from one another on parallel vertical axes 29, 29 (Fig. 1) spaced equidistantly with respect to the longitudinal median line of the sliding frame. Each bottom kerf cutter 3 includes an elongated horizontal plane cutter bar 30 having an endless cutter chain 31 guided for circulation about its margin. Each bottom cutter bar has a rear hanger frame 32 provided with a circular bearing engaging portion 33 swivelly mounted on a suitable bearing 34 supported by a depending cylindrical support 35 integral with the front frame portion 28. Each cutter bar has a floor engaging shoe 36 at its rearward end, integral with the hanger frame 32. The bottom cutter chains 31 are driven by motors 37, 37 carried by the upstanding portion 28 of the sliding frame 9 at the opposite sides of the longitudinal vertical center of the latter and these motors are horizontally disposed and are arranged with their motor shafts 38 extending in parallel relation lengthwise of the sliding frame 9. Keyed to the front end of each motor shaft, as shown in Fig. 5, is a spur pinion 39 which meshes with a large spur gear 40 journaled on a bearing 41 supported by a horizontal longitudinally extending shaft 42 suitably journaled within the forward frame portion 28. The gear 40 is connectable to the shaft 42 by a conventional sliding toothed clutch member 43 splined to the shaft and engageable with clutch teeth 44 formed within the hub of the spur gear. Keyed to the front end of the shaft 42 is a bevel pinion 45 which meshes with and drives a large bevel gear 46 herein formed integral with a vertical shaft 47 herein arranged coaxial with the bar pivot and suitably journaled within bearings supported by the front frame portion 28. Fixed to the lower end of this vertical shaft is a chain sprocket 48 which engages and drives the cutter chain. Thus, when the motors 37 are running and the clutches 43 are connected, the cutter chains 31 of the lower cutters bars may be rapidly circulated in their orbits in relatively opposite directions through the spur gearings 39, 40, bevel gearings 45, 46, vertical shafts 47, and chain sprockets 48.

Figure 3:
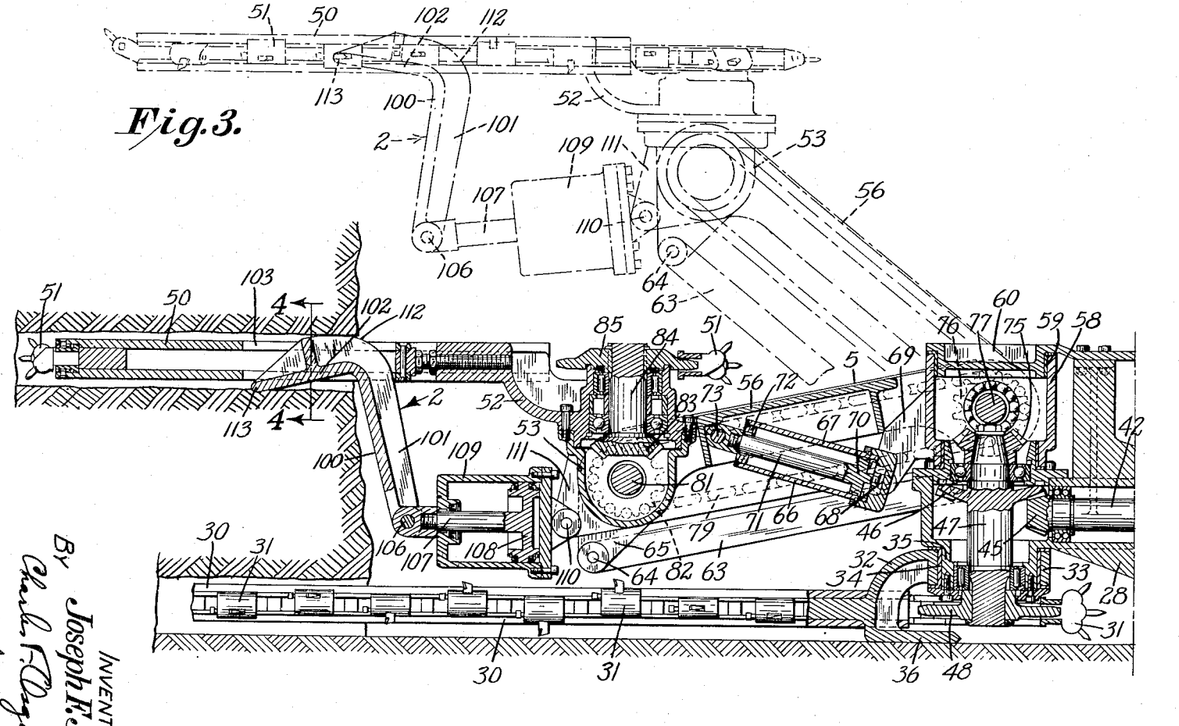
Fig. 3 is an enlarged longitudinal vertical sectional view taken substantially on line 3—3 of Fig. 1, with an elevated position of a top cutter bar indicated in dotted lines.
Figure 6:
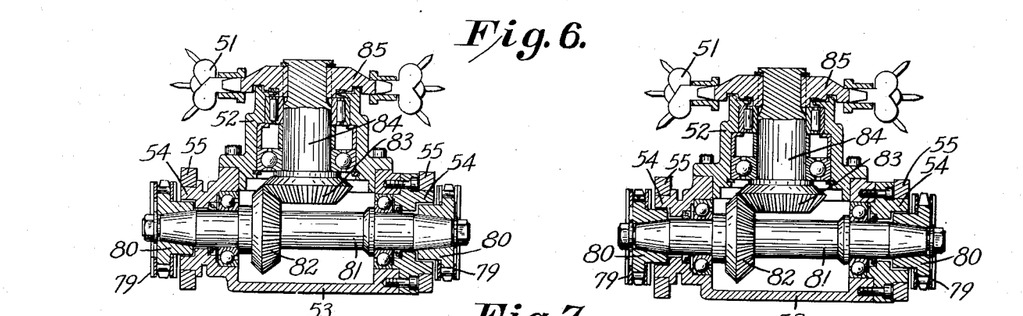
Figs. 6 and 7 are enlarged cross sectional views taken substantially on lines 6—6 and 7—7 respectively, of Fig. 1, with parts omitted to facilitate illustration.

The upper kerf cutters 4 each comprises an elongated horizontal plane cutter bar 50, superimposed with respect to the bottom cutter bar, and having an endless cutter chain 51 guided for circulation about its margin. Each cutter bar 50 has a rear hanger frame 52 rigidly secured to a housing 53 which has lateral trunnions 54 at its sides (Fig. 6). Pivotally engaging these trunnions are parallel side portions 55, 55 of an upper arm 56, and these side portions at the rear end of the arm pivotally engage trunnions 57 projecting laterally from the opposite sides of a swiveled housing 58. Each of these swiveled housings which support the upper cutter bars are swivelly mounted on suitable bearings 59 supported by cylindrical portions 60 and 61 of the front frame portion 28 of the sliding frame 9. Pivotally connected at 62 on pivots supported by each of the swiveled housings 58 are parallel lower arms 63 which are pivotally connected at 64 to lugs 65 integral with the front housing 53. The parallel arms 63 cooperate with the upper arms 56 to maintain the top cutter bars 50 in horizontal planes irrespective of the angular positions of the arms 56 and 63 about their pivots. Associated with the parallel arms for each upper cutter bar is a fluid jack 66 comprising a fluid cylinder 67 pivotally mounted at its rear end at 68 on pivots supported by lugs 69 which project forwardly from the swiveled housings 58 as shown in Fig. 3. Reciprocable in the cylinder is a piston 70 having its piston rod 71 extending forwardly and outwardly through the packed front cylinder head 72 and pivotally engaging a transverse pivot pin 73 supported by the upper arm 56. Thus, when fluid under pressure is supplied to these fluid jacks the parallel arms 56, 63 may be swung in vertical planes about their pivotal axes to move the upper cutter bars through a series of horizontal planes, thereby to vary the elevation of the top cutter bars with respect to the lower cutter bars. When fluid is trapped in the fluid jacks the upper cutter bars may be held in adjusted position and when fluid is vented from the jacks the upper cutter bars may be lowered through a series of parallel positions at a controlled rate. The control means for these elevating jacks will later be described.

Figure 7:
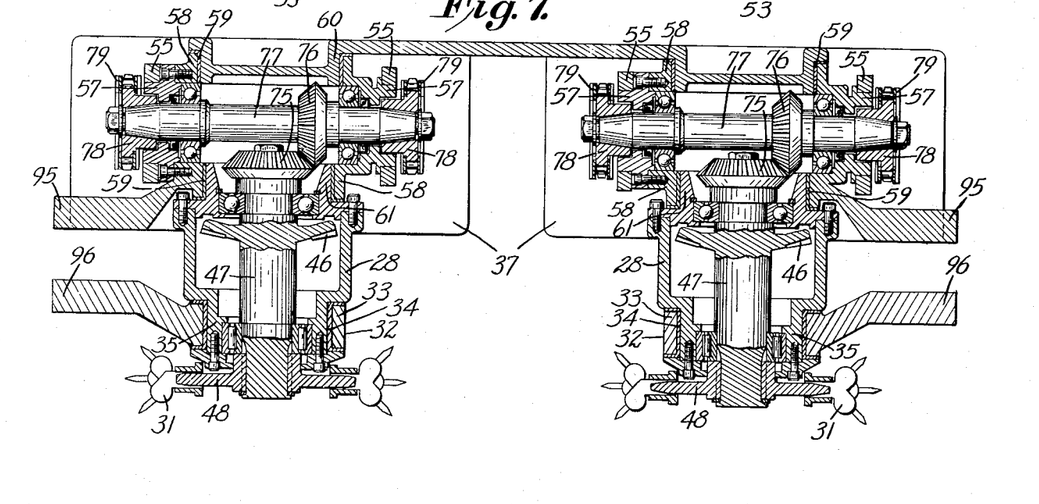

Now referring to the driving means for the upper cutter chains 51 it will be noted that keyed to the upper end of each of the vertical shafts 47 is a bevel gear 75 (Fig. 3) which meshes with a bevel gear 76 (see also Fig. 7) secured to a horizontal shaft 77. Each of the shafts 77 is arranged coaxial with the rear pivot of an upper arm 56 and is suitably journaled in bearings supported by the swiveled housing 58. Keyed to the opposite ends of each of the horizontal shafts 77 are chain sprockets 78 which are connected by endless drive chains 79 to chain sprockets 80 keyed to the opposite ends of a horizontal shaft 81. The shafts 81 are arranged coaxial with the front pivotal connection of the upper arms 56 with the housings 53 and are suitably journaled in bearings supported within these housings. Fixed to each of the shafts 81 is a bevel gear 82 which meshes with a bevel gear 83 fixed to a vertical shaft 84, the latter herein suitably journaled in bearings supported within the hanger frame 52. Keyed to the upper end of each of the shafts 84 is a chain sprocket 85 which engages and drives the upper cutter chain 51. Thus, when the shafts 42 are driven by the motors 37 the upper cutter chains 51 may be driven in relatively opposite directions through the bevel gearings 75, 76, horizontal shafts 77, the chain and sprocket connections 78, 79 and 80, horizontal shafts 81, bevel gearings 82, 83, vertical shafts 84, and sprockets 85, irrespective of the elevated position of the upper cutter bars.

Figure 1:
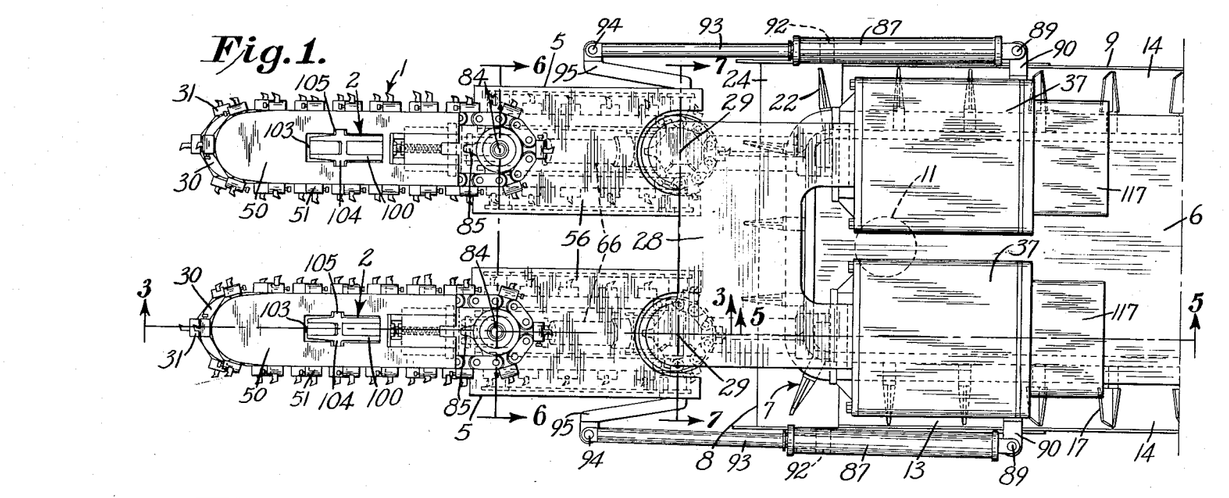
Figures 1A, 2A:
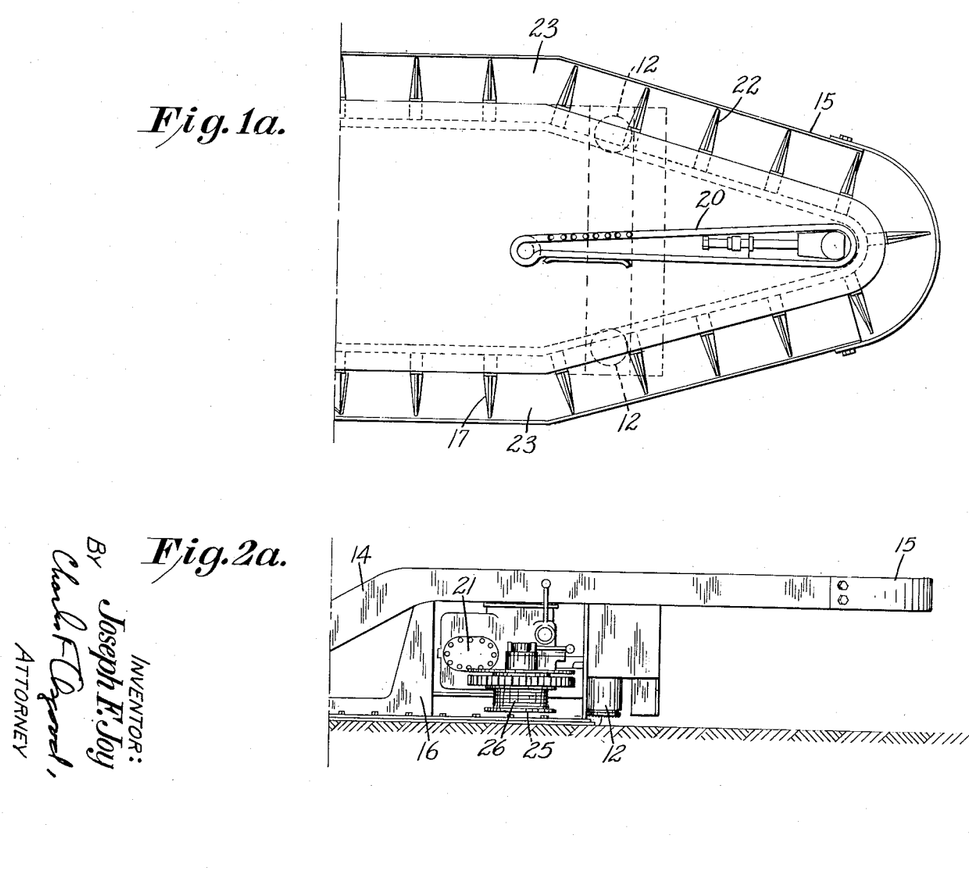
Figure 2:
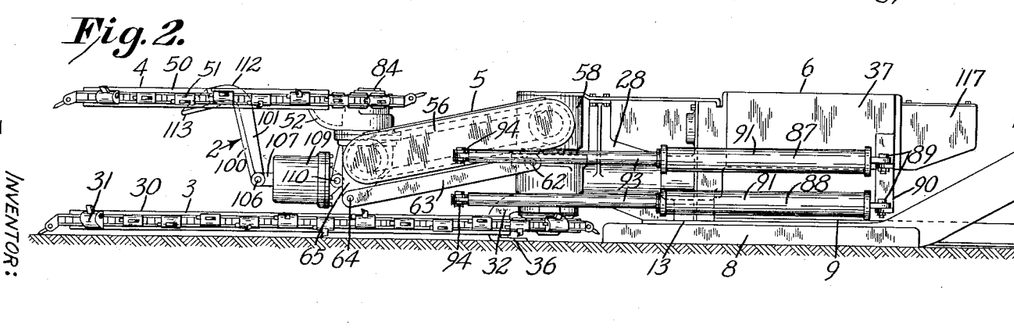

The pairs of upper and lower cutter bars 50 and 30 may be independently swung horzontally about their pivots and the swinging means for the bars comprises superimposed double-acting fluid jacks 87 and 88 arranged at the outer sides of the frame structure 6 and which are pivotally connected at their rear ends at 89 to brackets 90 secured to the outer sides of the casings of the motors 37 (Figs. 1 and 2). These jacks are swingable horizontally about their pivots outwardly from the sides of the sliding frame structure and each comprises a fluid cylinder 91 containing a reciprocable piston 92 having its piston rod 93 extending forwardly and outwardly through the front cylinder heads. The forward ends of the piston rods are pivotally connected at 94 to the outer ends of lateral arms 95 and 96 herein desirably formed integral with the swiveled frames 58 and 32 respectively, on which the upper and lower cutter bars are mounted. The upper lateral arms 95 are so arranged with respect to the "parallel motion" arms 56 and 63 that the latter may swing freely in vertical planes without interference. Thus, by properly supplying fluid under pressure to the jack cylinders, the upper and lower cutter bars may be swung horizontally about their pivots toward and from one another, and by trapping the fluid in the jack cylinders the cutter bars may be locked in the desired angular positions about their pivots. The control means for these bar swing jacks will later be described.

Figure 4:
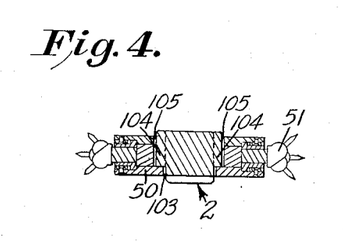
Fig. 4 is a cross sectional view taken on line 4—4 of Fig. 3.

The dislodging mechanisms 2 associated with the upper cutter bars 50 each comprises a bellcrank lever 100 having a depending arm 101 an an upper right angle arm portion 102. The lever is mounted in a longitudinal opening 103 in the cutter bar within the orbit of the cutter chain and has lateral pivot portions 104 at the sides of the upper lever portion 102 and detachably pivotally engaged in recesses 105 in the cutter bar at the sides of the opening 103 (see Figs. 3 and 4). The depending arm 101 is pivotally connected at 106 at its inner lower end to the front end of a piston rod 107 of a reciprocable piston 108 contained in a double acting fluid jack cylinder 109. The fluid cylinder is pivotally connected at 110, on an axis parallel to the pivotal axis of the lever 100, to lugs 111 herein formed integral with the housing 53. The lever portion 102 has a curved upper surface 112 engageable with the top wall of a kerf cut in the coal by the upper kerf cutter, and formed at the forward lower portion of the arm portion 102 is a pointed end 113 engageable with the bottom wall of the kerf. Normally, during cutting, the lever portions 102 are maintained retracted within the opening 103 substantially inside the top and bottom limits of the top cutter bars. Thus, the breaker lever may swing about its pivot to engage the upper surface of a projecting core of coal formed by the upper and lower cutter bars and when fluid under pressure is properly supplied to the jack cylinder the lever arm may be swung to effect breaking down of the core of coal in the manner to be later explained more in detail. The control means for the fluid jacks will be later described. Evidently, the location of the breaker levers with respect to the upper cutter bars may be varied to suit different conditions and the proportions of the lever arms may be modified to vary the points of contact of the levers with the core of coal to vary the dislodging action.

Figure 8:
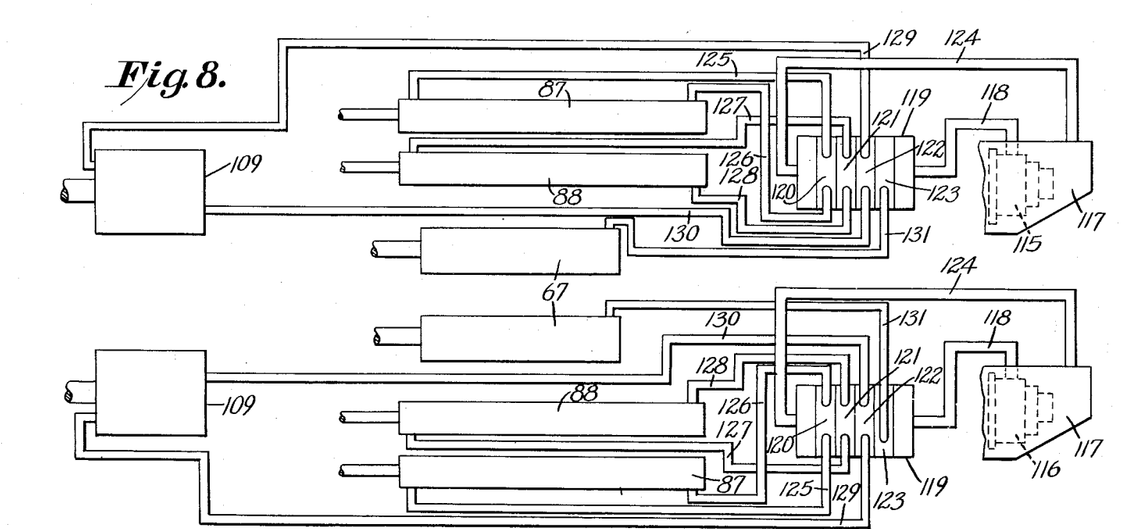
Fig. 8 is a diagrammatic view illustrating the hydraulic fluid system associated with the kerf cutting means and the dislodging mechanisms.

The hydraulic fluid system associated with the kerf cutting means and dislodging mechanisms, is shown diagrammatically in Fig. 8, and comprises variable displacement fluid pumps 115 and 116 herein arranged in housings 117 secured to the rear ends of the casings of the motors 37 and driven from the rear ends of the motor shafts 38. These pumps may be similar to those disclosed in my copending application, Serial No. 723,436, filed January 21, 1947, now Patent No. 2,646,755, and, accordingly, will not be described in detail herein. The housings provide fluid tanks and contain a liquid such as a light lubricating oil, and the pump intakes are connected to the interior of the housings below the fluid level. The pump discharges are connected by conduits 118 to the pressure passages of conventional control valve mechanisms 119 which may be mounted in convenient locations on the sliding frame structure 6. There is one control valve mechanism individual to each pair of superimposed kerf cutters and the associated dislodging mechanisms and while two displacement pumps are disclosed evidently if desired but a single pump may supply fluid under pressure to both valve mechanisms. These valve mechanisms each comprise a valve box having parallel bores for receiving conventional balanced spool type slide valves 120, 121, 122 and 123. The discharge passages of the valve boxes are connected by return conduits 124 back to the fluid tanks provided by the pump housings 117. The bore containing the slide valve 120 is connected by conduits 125 and 126 to the opposite ends of the cylinder of one of the upper bar swing jacks 87 while the bore containing the valve 121 is connected by conduits 127 and 128 to the opposite ends of the cylinder of one of the lower bar swing jacks 88. The bore containing the slide valve 122 is connected by conduits 129 and 130 to the opposite ends of one of the breaker jack cylinders 109 while the bore containing the slide valve 123 is connected by a conduit 131 to one end of one of the elevating jack cylinders 67. Similar valves and conduits are provided for the other jacks controlled by the other valve mechanism. Each of the valve mechanisms has a conventional relief valve device embodied therein to prevent the building up of excessive pressures in the fluid systems.

Figure 9:
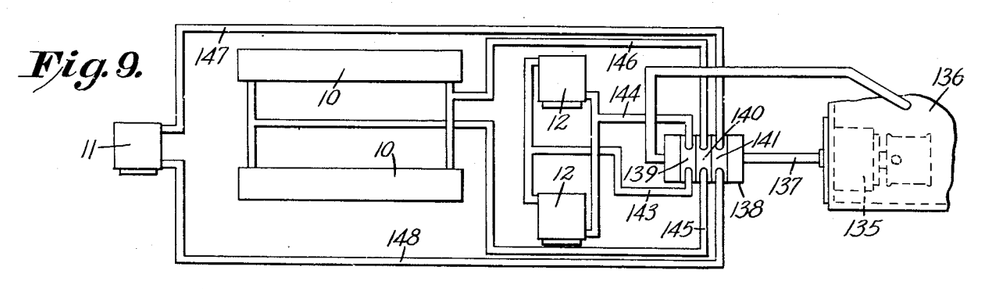
Fig. 9 is a diagrammatic view illustrating the hydraulic fluid system associated with the bottom skid and jack mechanism for "walking" the apparatus over the mine floor.

As shown diagrammatically in Fig. 9, the hydraulic system for the "walking" means for the apparatus comprises a conventional fluid pump 135 arranged in a fluid tank 136 and this pump may be driven by the motor 21 arranged at the rear end of the sliding frame 9. The fluid tank 136 may be arranged within the rear frame structure 16 at the rear end of the sliding frame. The pump discharge is connected by a conduit 137 to the pressure passage of a conventional slide valve mechanism 138, also conveniently located on the sliding frame structure. This slide valve mechanism includes a valve box having parallel bores for receiving conventional balanced spool type slide valves 139, 140 and 141. The discharge passage of the valve box is connected by a return conduit 142 back to the fluid tank 136. The bore containing the slide valve 139 is connected by conduits 143 and 144 to the opposite ends of the cylinders of the rear floor jacks 12. The bore containing the slide valve 140 is connected by conduits 145 and 146 to the opposite ends of the cylinders of the feeding and retracting jacks 10, while the bore containing the slide valve 141 is connected by conduits 147 and 148 to the opposite ends of the cylinder of the front floor jack 11. The control valve mechanism has a conventional relief valve device embodied therein for preventing excessive pressure in the fluid system.

Figure 10:
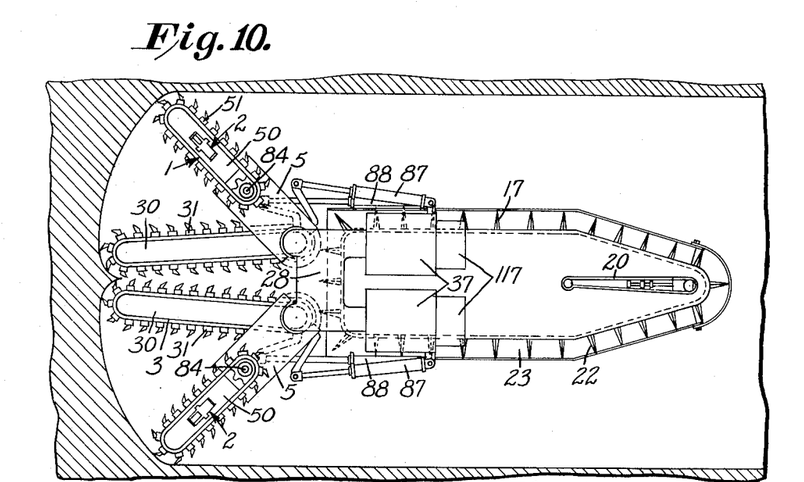
Figs. 10, 11 and 12 are diagramatic views illustrating various operating positions of the mining and loading apparatus in a mine.
Figure 11:
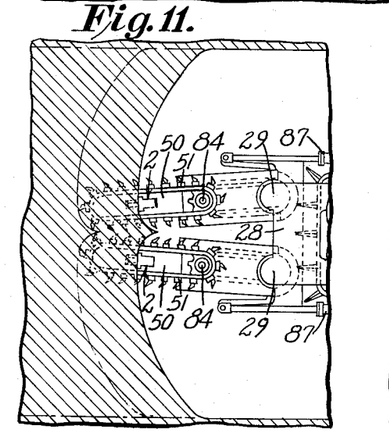
Figure 12:
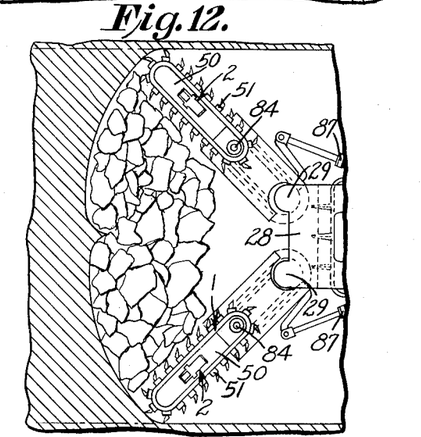
Figure 13:
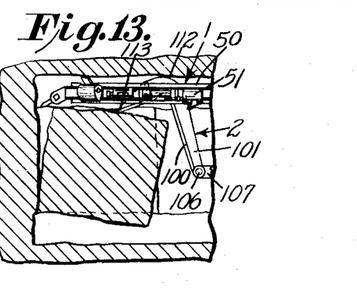
Fig. 13 is a diagrammatic view illustrating the manner of dislodging the core of coal by means of the dislodging mechanisms.

The general mode of operation of the improved mining and loading apparatus is as follows: The apparatus may be moved over the mine floor by the bottom skid, the feeding and retracting jacks and the floor jacks in the manner fully disclosed in my Patent No. 2,261,160 mentioned above. If desired, during tramming of the apparatus about the mine the apparatus may be mounted on a suitable transport vehicle in a well-known manner. When the working place is reached with the apparatus located in adjacency to the coal face, as shown in Figs. 10, 11 and 12, the clutches 43, 44 may be connected to effect rapid circulation of the cutter chains in their orbits about the margins of the cutter bars and fluid under pressure may be supplied to the bar swing jacks 87 and 88 under the control of the slide valves 120 and 121 to swing the upper and lower cutter bars inwardly toward one another to bring their outer tip ends into adjacency, close to the coal face near the center of the latter, and thereafter the fluid may be trapped in the bar swing cylinders to lock the cutter bars in position. Fluid under pressure may then be supplied to the feed jacks 10 under the control of the slide valve 140 to feed the sliding frame 9 forwardly along its guideway relative to the bottom skid 8 to sump the upper and lower cutter bars simultaneously into the coal, and thereafter the fluid may be trapped in the feed cylinders to hold the cutter bars in their forward sumped position. Fluid under pressure may then be supplied to the lower bar swing jacks 88 to swing the bottom cutter bars 30 horizontally away from one another about their pivots to cut a horizontal kerf across the coal face near the level of the mine floor and when the bottom cutters assume their wide apart position with their tip ends located in adjacency to the ribs the fluid may be trapped in the bar swing jacks 88 to lock the cutter bars in such position. Fluid under pressure may then be supplied to the upper bar swing jacks 87 to swing the upper cutter bars 50 horizontally in opposite directions about their pivots to cut a parallel superimposed kerf in the coal and at intervals the breaker jack cylinders 109 may be operated under the control of the slide valves 122 to swing the breaker levers to break down fragments of the projection or core of coal between the parallel kerfs. The upper cutter bars are swung wide apart until their outer tip ends reach the ribs as shown in Fig. 10. After the core of coal has been dislodged and is piled up in fragments on the mine floor as shown in Fig. 12, fluid under pressure may be supplied to the lower bar swing jacks 88 to swing the lower cutter bars 30 inwardly toward one another about their pivots and as these bottom cutter bars swing inwardly the inner adjacent runs of their cutter chains act on the dislodged coal to move the dislodged coal on the mine floor rearwardly onto the front receiving end of the conveying means 7, and the latter moves the coal rearwardly and upwardly to discharge at a suitable elevated point of delivery at the rear end of the apparatus. The distance between the parallel kerfs cut in the coal may be varied by supplying fluid under pressure to the elevating jacks 67 under the control of the slide valves 123 to swing the "parallel motion" arms 56, 63 about their pivots to vary the elevation of the upper cutter bars 50 with respect to the bottom cutter bars 30. As the "parallel motion" arms 56 and 63 are swung in vertical planes about their pivots the upper cutter bars 50 are maintained in horizontal planes. Thus, cores or projections of coal of different height may be cut in the coal seam and irrespective of the height of the core the dislodging mechanisms may be operated to break down fragments of the core as cutting progresses. To facilitate rapid movement of the apparatus over the mine floor the feed cable 26 wound on the feed drum 25 may have its free end attached to a suitable anchor jack located at a remote point so that when the cable is wound in by the drum the apparatus may be moved rapidly over the mine floor toward the anchor jack, in the manner well known to those skilled in the art. Evidently, if desired the pairs of cutter bars 30 and 50 may be sumped into the coal face at the ribs and may then be swung inwardly about their pivots toward one another to effect cutting of the parallel superimposed kerfs in the coal seam. Also the cutter bars may be sumped into the coal and swung in various manners and regardless of the manner of operation of the cutter bars the dislodging mechanisms 2 may be operated to dislodge the projection or core of coal formed between the parallel kerfs. In Fig. 13 the manner of the breaking down fragments of the core of coal is shown diagrammatically, and during this operation the lower bars are swung laterally to one side so that the core is broken down toward an open kerf.

As a result of this invention an improved mining and loading apparatus is provided whereby the mineral of a solid mine vein may be cut, dislodged and loaded in an efficient manner and without the use of explosives. By the provision of the novel adjustable mountings for the upper cutter bars parallel kerfs may be cut in the mine vein at different distances apart to form projections or cores of coal of different heights and by the provision of the novel dislodging mechanisms associated with the upper cutter bars the projection or core of coal may be dislodged as cutting progresses. By mounting the breaker levers in the novel manner disclosed in the upper cutter bars the levers may act against the top wall or surface of the upper kerf so that a powerful prying, lever action may be applied to the top of the core effectively to break down the latter. By the provision of the sets or gangs of superimposed cutter bars and the novel mounting and operating means therefor the mineral of a solid mine vein may be quickly cut, dislodged and loaded out. The improved mining and loading apparatus is compact and rugged in design and extremely flexible in operation, well adapted for its intended purpose. These and other advantages of the invention, together with other manners of use, will be clearly apparent to those skilled in the art.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. In a mining apparatus, the combination comprising a base, pairs of superimposed horizontal kerf cutters pivotally mounted on said base and cooperating to cut parallel superimposed horizontal kerfs in common horizontal planes in a solid mine vein to form cores of mineral between the kerfs, the upper kerf cutters of said pairs having openings therein, dislodging mechanisms associated with the upper kerf cutters respectively and mounted for movement in vertical planes relative thereto for applying at intervals during the kerf cutting operation dislodging pressures to the cores to dislodge fragments of the latter as cutting progresses, said dislodging mechanisms each including a pivoted breaker lever mounted within the opening in an upper kerf cutter and formed to project beyond its kerf cutter to engage both the upper wall of the top kerf and the top of a core, and power operating means for said levers effective while said upper kerf cutters remain in horizontal planes for swinging said levers as aforesaid relative to said upper kerf cutters to apply a powerful downward prying action to the tops of the cores to break off fragments of the latter as cutting progresses.

2. In a mining apparatus, the combination comprising a base, pairs of superimposed horizontal kerf cutters pivotally mounted on said base and cooperating to cut parallel superimposed horizontal kerfs in common horizontal planes in a solid mine vein to form cores of mineral between the kerfs, and dislodging mechanisms associated with the upper kerf cutters respectively and mounted for movement relative thereto for applying at intervals during the kerf cutting operation dislodging pressures to the cores to dislodge fragments of the latter as cutting progresses, said dislodging mechanisms each including a pivoted breaker lever mounted within an opening in an upper kerf cutter and formed to project beyond its kerf cutter to engage both the upper wall of the top kerf and the top of a core to apply a powerful downward prying action to the top of the core to break off fragments of the latter, said layer having an arm projecting from its kerf cutter outwardly beyond the core, and an extensible power actuator mounted on said base outside of the face of the mine vein for effecting swinging of said lever about its pivot relative to the kerf cutter.

3. In a mining and dislodging apparatus, the combination comprising a base, a pair of superimposed horizontal kerf cutters mounted on said base for cutting parallel horizontal kerfs in a solid mine vein, mounting means for said kerf cutters carried by said base whereby the bottom kerf cutter may be moved laterally from beneath the top kerf cutter subsequently to the kerf cutting operation, and a dislodging mechanism carried by said top kerf cutter and movable relative thereto into engagement with the core of mineral formed between the parallel kerfs for applying a downward dislodging pressure to the core to break down the latter toward the open bottom kerf, said dislodging mechanism comprising a breaker level pivotally mounted in said top kerf cutter to swing in vertical planes with respect thereto and having a projecting and engaging the top of said core of mineral and a spaced opposite portion engaging the top wall of the kerf, and an actuator arranged on said base outside the face of the mine vein and connected to said lever for swinging the latter about its pivot relative to said top kerf cutter to apply a powerful breaking down action to the core.

4. In a mining apparatus, the combination comprising an elongated horizontal plane cutter bar, an endless cutter chain guided for circulation about the margin of said bar for cutting a plane horizontal kerf in a solid coal seam, said bar having a centrally located, longitudinal opening therethrough within the orbit of said cutter chain, and a breaker mechanism associated with said cutter bar and including a breaker lever arranged in said bar opening and pivotally mounted on said bar to swing relative thereto in planes perpendicular to the planes of said cutter bar, said lever upon swinging thereof about its pivot engaging the parallel top and bottom walls of the kerf to apply a breaking down pressure to the coal below said kerf while said cutter bar remains in horizontal position.

5. In a mining apparatus, the combination comprising an elongated horizontal plane cutter bar, an endless cutter chain guided for circulation about the margin of said bar for cutting a horizontal plane kerf in a solid coal seam, said bar having a centrally located, longitudinal opening therethrough within the orbit of said cutter chain, and a breaker mechanism associated with said cutter bar and including a breaker lever arranged in said bar opening and pivotally mounted on said bar to swing relative thereto in planes perpendicular to the planes of said cutter bar, and means for swinging said lever about its pivot relative to said cutter bar while the latter remains in horizontal cutting position to bring spaced points on said lever into concurrent engagement with the top and bottom walls of the kerf to dislodge fragments of the coal below said kerf, said swinging means comprising a fluid jack located exteriorly of said cutter bar, said lever having an arm projecting outwardly from said bar and said jack connected to the projecting end of said arm.

6. In a mining apparatus, the combination comprising a support, a cutter bar carried by said support, an endless cutter chain guided for circulation about the margin of said bar, said cutter bar being movable laterally to cut a kerf in a solid mine vein, a breaker lever pivotally mounted on said cutter bar within the chain orbit to swing in planes perpendicular to the plane of said cutter bar, said lever projecting within the kerf formed by the cutter bar and having a lever arm projecting from said cutter bar outside of the kerf, a fluid cylinder pivotally mounted on said support to swing about an axis parallel to the axis of pivotal movement of said lever, and a piston reciprocable in said cylinder and pivotally connected to said lever arm, for swinging said lever about its pivot relative to said cutter bar.

7. A kerf cutting and dislodging mechanism comprising, in combination, a plane cutter bar having an opening arranged centrally between its sidses, an endless cutter chain guided for circulation in an orbital path about the margin of said bar, said opening located within the orbit of said cutter chain, said cutter bar movable in its plane to cause said cutter chain to cut a plane kerf in a solid mine vein, and a breaker lever having a lever portion arranged in said opening and movable into the kerf with said cutter bar, said lever pivotally mounted on said bar at the sides of said opening and swingable about its pivot in planes perpendicular to the plane of said cutter bar while the latter moves in its plane thereby to project said lever portion outwardly from said opening substantially beyond the bounding surfaces of said bar into dislodging contact with a wall of the kerf to apply a dislodging pressure to the mineral to be dislodged.

8. A kerf cutting and dislodging mechanism comprising, in combination, a plane cutter bar having an opening arranged centrally between its sides, an endless cutter chain guided for circulation in an orbital path about the margin of said bar, said opening located within the orbit of said cutter chain, said cutter bar movable in its plane to cause said cutter chain to cut a plane kerf in a solid mine vein, and a breaker lever having a lever portion arranged in said opening and movable into the kerf with the cutter bar, said lever pivotally mounted on said bar at the sides of said opening, said lever being swingable about its pivot in planes perpendicular to the plane of said cutter bar while the latter moves in its plane to project oppositely extending portions of said lever outwardly from said opening substantially beyond the opposite plane surfaces of said bar to bring spaced points of said lever into dislodging contact with the opposed walls of the kerf to apply a dislodging pressure to the mineral to be dislodged.

9. In a mining apparatus, kerf cutting mechanism for cutting parallel superimposed kerfs in a solid mine vein to form a core of mineral between the kerfs, a core breaker associated with said kerf cutting mechanism and including a breaker lever having spaced portions respectively engageable with the top wall of the upper kerf and the top surface of the core at laterally spaced points, and effective upon swinging of said lever to apply a downward dislodging force to the top of the core to break off the latter from the solid vein, and a fluid jack connected to said lever at a point remote from said spaced points of engagement for swinging said lever, said jack located outside the face of the mine vein wholly outside of said kerfs.

10. A coal breaker designed for use with a kerf cutting means of the type having a swingable kerf cutter comprising a plane cutter bar about which an endless cutter chain is guided for orbital circulation, comprising a lever pivotally mounted in an opening in said cutter bar within the orbit of the cutter chain, said lever having a short arm portion and an angularly related long arm portion with the lever pivot locatel at said short arm portion and with the pivotal axis extending in parallelism to the planes of said bar intermediate the parallel plane surfaces of said bar, said short arm portion disposable substantially within the bar opening substantially between said parallel bar surfaces and said long arm portion projecting outwardly from said bar opening, and a power device connected to the extremity of said long arm portion for swinging said lever about its pivot relative to said bar to bring said short arm portion into engagement with the opposed walls of a kerf formed by the kerf cutter to apply a powerful dislodging pressure to the mineral in which said kerf is formed.

11. A coal breaker as set forth in claim 10 wherein the lever pivot is provided by oppositely extending pivot portions detachably received within recesses in the cutter bar at the sides of the bar opening whereby said lever may be bodily released from the cutter bar.

12. A coal breaker as set forth in claim 10 wherein said short arm portion engages the opposite walls of the kerf at spaced points with said points spaced apart longitudinally of the kerf whereby a powerful lever action is attained upon swinging of said lever.

13. A coal breaker comprising a support, a breaker lever pivotally mounted on said support and having a short arm portion adapted to project into a kerf formed in a solid mine vein, said lever having an angularly related long arm portion with the lever pivot located at said short arm portion and with the pivotal axis extending in parallelism to the planes of the kerf intermediate the walls of the kerf, said long arm portion projecting outwardly from the kerf outside of the face of the mine vein, and a power device mounted on said support and connected to the extremity of said long arm portion for swinging said lever about its pivot relative to said support to bring spaced points on said short arm portion into engagement with the opposed walls of the kerf to apply a powerful dislodging pressure to the mineral in which the kerf is formed.

References Cited in the file of this patent
UNITED STATES PATENTS

| Number | Name | Date |
|---|---|---|
| 809,350 | Wissemann | Jan. 9, 1906 |
| 1,285,332 | Noble | Nov. 19, 1918 |
| 1,317,812 | Noble | Oct. 7, 1919 |
| 1,778,295 | Levin | Oct. 14, 1930 |
| 2,007,905 | Osgood | July 9, 1935 |
| 2,148,495 | Osgood | Feb. 28, 1939 |
| 2,261,160 | Joy | Nov. 4, 1941 |
| 2,261,162 | Joy | Nov. 4, 1941 |